(12) United States Patent
Vennemann

(10) Patent No.: US 8,024,988 B2
(45) Date of Patent: Sep. 27, 2011

(54) DRIVE UNIT FOR A MOTOR VEHICLE

(75) Inventor: Klaus-Guenter Vennemann, Traunstein (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 12/643,452

(22) Filed: Dec. 21, 2009

(65) Prior Publication Data
US 2010/0099536 A1  Apr. 22, 2010

Related U.S. Application Data

(63) Continuation of application No. PCT/DE2008/001029, filed on Jun. 18, 2008.

(30) Foreign Application Priority Data

Jul. 9, 2007 (DE) .................. 10 2007 031 895

(51) Int. Cl.
*F16H 3/093* (2006.01)

(52) U.S. Cl. ............ 74/330; 477/174; 477/906; 701/62; 74/331

(58) Field of Classification Search .............. 74/330, 74/331; 192/85.52, 85.57, 48.9; 477/906; 701/62

See application file for complete search history.

(56) References Cited

U.S. PATENT DOCUMENTS
2007/0068297 A1 *  3/2007  Hori et al. ............. 74/335

FOREIGN PATENT DOCUMENTS
| DE | 3446460 C2 | 7/1986 |
| DE | 10013576 A1 | 9/2000 |
| DE | 10064459 A1 | 9/2001 |
| DE | 10155458 A1 | 5/2002 |
| DE | 10238403 A1 | 4/2003 |
| DE | 10308698 A1 | 9/2003 |
| DE | 10308700 A1 | 10/2003 |
| DE | 102005061078 A1 | 7/2006 |
| EP | 1531292 A2 | 5/2005 |
| EP | 1632694 A | 3/2006 |
| WO | 2004/097266 A | 11/2004 |

* cited by examiner

*Primary Examiner* — David D Le
*Assistant Examiner* — Derek D Knight
(74) *Attorney, Agent, or Firm* — Simpson & Simpson, PLLC

(57) ABSTRACT

A drive unit for a motor vehicle, comprising an engine, a transmission or gearbox, a clutch aggregate for transmitting torque, the clutch aggregate including at least two friction clutches that are assigned to an input shaft of the transmission or gearbox, wherein at least one of the at least two friction clutches features an energy accumulator operatively arranged to generate a lock-up force required for torque transmission through the clutch aggregate, and a control unit operatively arranged to control an automatic activation of the at least two friction clutches and the transmission or gearbox, wherein in the event of a malfunction of the activation of the friction clutch, the stored energy in the accumulator creates an interruption of torque transmission within a section of the drive unit connected downstream of the clutch aggregate.

5 Claims, 1 Drawing Sheet

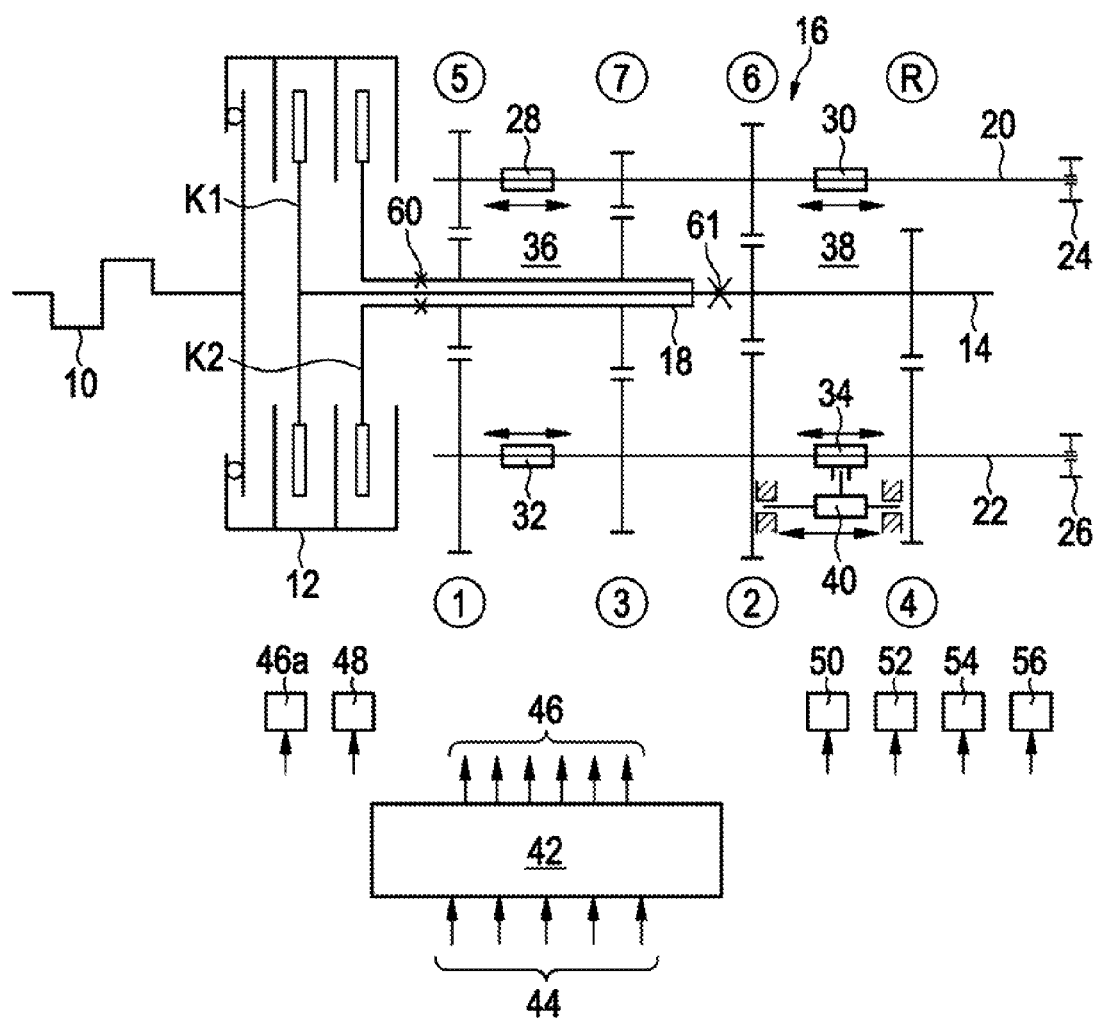

DRIVE UNIT FOR A MOTOR VEHICLE

CROSS-REFERENCE TO RELATED APPLICATIONS

This application is filed under 35 U.S.C. §120 and §365(c) as a continuation of International Patent Application PCT/DE2008/001029, filed Jun. 18, 2008, which application claims priority from German Patent Application No. 10 2007 031 895.4, filed Jul. 9, 2007, which applications are incorporated herein by reference in their entireties.

FIELD OF THE INVENTION

The invention relates to a drive unit for a motor vehicle, comprising at least a drive engine, transmission (gearbox) and a clutch unit that ensures the transmission of torque between the latter and has at least two friction clutches which are each assigned to transmission (gearbox) input shaft, wherein at least one of the friction clutches features at least an energy accumulator that at least essentially generates the lock-up force required for torque transmission, so that this friction clutch automatically assumes a closed state. In such drive units, at least the friction clutches and the gearbox but in many cases, the engine as well as an internal combustion engine is actuated automatically or semi-automatically by means of at least a control unit or device.

BACKGROUND OF THE INVENTION

Drive units for motor vehicles of the type mentioned above are, for instance, proposed by DE 10 2005 061 078 A1, DE 103 08 700 A1, and DE 103 08 698 A1. Special designs of the so-called twin clutches for application with such drive units are, for instance, proposed by DE 102 38 403 A1, DE 34 46 460 C2, DE 100 64 459 A1, DE 100 13 576 A1 and DE 101 55 458 A1. Basically, both types of twin clutches are known, whereby both clutches are closed from outside by forces applied forcibly to the actuating means of the clutches as well as twin clutches by which the clutches feature a separate energy accumulator, e.g. a diaphragm spring that at least partially applies the contact force required for closing the friction clutch. The latter clutches involve the so-called closing clutches, whereas by the clutches that are closed mainly by means of force applied from outside are called automatically opening clutches. Also embodiments of a twin clutch are possible, in which a closing as well as an automatically opening friction clutch is available.

Only the automatically opening clutches have prevailed in practice, in particular when the so-called dry clutches are used in connection with a power shift gearbox. This design is necessary to ensure that both clutches will open in the event of a malfunction in the activation system of the power shift gearbox and/or at least in the event of a malfunction in one of the two friction clutches. Thereby, damage to the drive train can be avoided, in particular in the gearbox, for instance, because of a blocking effect when both friction clutches are closed. The reasons for such malfunctions within the control device and the actuators controlled by this control device are, for example, power failures that interrupt the hydraulic and/or pneumatic and/or electric power supply to the respective actuators. A cause of power failure, for instance, can be a fallen connector or failure of a circuit breaker. To avoid critical driving situations, automatically opening friction clutches have been used as already mentioned above. These clutches open automatically in the event of certain operational malfunctions.

BRIEF SUMMARY OF THE INVENTION

The present invention broadly comprises a drive unit for a motor vehicle, comprising an engine, a transmission or gearbox, a clutch aggregate for transmitting torque, the clutch aggregate including at least two friction clutches that are assigned to an input shaft of the transmission or gearbox, wherein at least one of the at least two friction clutches features an energy accumulator operatively arranged to generate a lock-up force required for torque transmission through the clutch aggregate, and a control unit operatively arranged to control an automatic activation of the at least two friction clutches and the transmission or gearbox, wherein in the event of a malfunction of the activation of the friction clutch, the stored energy in the accumulator creates an interruption of torque transmission within a section of the drive unit connected downstream of the clutch aggregate.

In one embodiment, the interruption of torque transmission takes place within the transmission or gearbox. In one embodiment, the auxiliary clutch is opened to facilitate the interruption of torque transmission. In one embodiment, the auxiliary clutch can be closed again after elimination of the malfunction. In another embodiment, means for interruption of torque transmission are connected upstream of gears that are accommodated on the gearbox input shaft assigned to the clutch aggregate with the energy accumulator. In one embodiment, the interruption of torque transmission takes place through disengagement of a gear of the transmission or gearbox. In one embodiment, to facilitate disengagement of the gear, a jolting effect is generated in the drive train by activation of the engine and/or a brake of the drive unit.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 1 is a schematic of a drive unit with a power shift or twin clutch gearbox.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The crankshaft 10 of an internal combustion engine is connected with the housing of a twin clutch 12 that contains two clutches K1 and K2 that can be actuated separately from one another. Using the clutch K1, the crankshaft 10 can be coupled with a first input shaft 14 of a twin clutch gearbox designated with 16 as a complete unit. Using the clutch K2, the crankshaft 10 can be coupled with a second input shaft 18 of the twin clutch gearbox 16. The second input shaft 18 is hollow so that the first input shaft 14 extends through the second input shaft 18.

Gear wheels are connected non-rotatably with each of the input shafts 14 and 18, which mesh with gear wheels that are disposed axially fixedly but rotatably on the output shafts 20 and 22 parallel to the input shafts 14 and 18. An output pinion 24 or 26 is rigidly connected with each of the output shafts 20 and 22, which, if necessary, acts through intermediate transmission ratios, on a drive shaft for propelling at least of one vehicle wheel.

The gear wheels supported on the output shafts 20 or 22 can be coupled non-rotatably with the respective output shaft by the selector forks 28, 30, 32 and 34 respectively. Gears designated in FIG. 1 with 1, 2, 3, 4, 5, 6, 7 and R are shifted by means of non-rotatable coupling of a gear wheel mounted on an output shaft with the respective output shaft. For simplicity, mating gears for selecting the reverse gear R are not included in the drawing.

As apparent directly from FIG. 1, the gear wheels connected non-rotatably with the second input shaft 18 with the gear wheels on the output shaft meshing with them form a first partial transmission 36 with which the odd gears are shifted. The gear wheels connected non-rotatably with those on input shaft 14 form a second partial transmission 38, with complementary gear wheels with which even gears and the reverse gear are shifted.

To move a selector fork along the corresponding output shaft, movably guided shift guides are provided in parallel to facilitate the movement of the selector forks, for instance, which are movable to-and-fro by means of a double-acting shift cylinder. In FIG. 1, the shift guide assigned to the selector fork 34 is designated 40.

The twin clutch gearbox 16 is controlled with the help of at least an electronic control device 42, whose inputs 44 are connected with sensors—not depicted—for detecting operating parameters that are decisive for the operation of the twin clutch gearbox. Outputs 46 of the control device 42 are connected with actuators for activating the twin clutch gearbox, likewise are two clutch actuators 46a and 48 provided for activating the clutches K1, K2, and four shift actuators 50, 52, 54 and 56 for activating each shift guide respectively.

The object of the invention is to provide measures and/or devices that enable the use of at least one and preferably two automatically closing friction clutches in connection with a power shift gearbox and at the same time ensure safe operation of the drive train or the motor vehicle equipped with it. Furthermore, the embodiment according to the invention shall facilitate energy saving operation of the drive unit for a motor vehicle.

In accordance with the present invention, this can occur with a drive unit of the kind mentioned above; among others, in the event of a malfunction of at least the activating system of one of the friction clutches, interruption of torque transmission shall take place within the drive-train section downstream of the clutch aggregate. Such interruption of torque transmission can be provided in an advantageous manner between at least one automatically closing friction clutch and the gearbox input shaft driven by the latter. The interruption can also take place, for instance, in the section of meshed gear wheel pairs which, at the given time point, facilitate torque transmission. Corresponding interruption, for instance, can take place between a driven gear wheel disposed on the transmission (gearbox) input shaft and the input shaft or even between a driven gear wheel disposed on a driven-shaft and the driven shaft. The interruption can be ensured in the process by disengagement of the respective gear. To facilitate disengagement of the gear through the activation of an internal combustion engine and/or vehicle brake, a jolting effect can be generated, through which temporary relief from the state of stress within the drive train can be attained; this assists disengagement of the gear.

Although the prior-mentioned torque interruption can take place in an advantageous manner within the gearbox, it can also be reasonable to connect the means required for this downstream or connect devices upstream of the twin clutch aggregate and downstream of the gearbox, so that on the one hand the gearbox can be decoupled from the engine and on the other hand from the driven wheels and hence render it free of torque.

Interruption of torque transmission can take place advantageously by means of an auxiliary clutch. In this case, the auxiliary clutch is preferably formed such that it closes automatically again after elimination of the malfunction or activation fault. The prior-mentioned means, or the auxiliary clutch for interrupting the torque transmission can be connected upstream of the gears or drive gear wheels accommodated on the gearbox input shaft assigned to the respective automatically closing clutch. These means or the auxiliary clutch for the gearbox input shaft 18 are symbolically depicted or designated with 60 and the gearbox input shaft 14 designated with 61 in FIG. 1.

The prior-mentioned disengagement of at least transmission (gearbox) gear to interrupt torque transmission occurs with the help of gearbox shift means that in this case are formed by selector forks 28, 30, 32, and 34. As already mentioned, this disengagement of a gear can be facilitated by initiating a jolting effect within the drive train.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A drive unit for a motor vehicle, comprising:
an engine;
a transmission or gearbox;
a clutch aggregate for transmitting torque, the clutch aggregate including at least two friction clutches that are assigned to respective first and second input shafts of the transmission or gearbox, wherein torque is transmitted through the clutch aggregate when at least one of the at least two friction clutches is closed; and,
a control unit operatively arranged to control an automatic activation of the at least two friction clutches and the transmission or gearbox, wherein in the event of a malfunction of the activation of at least one of the at least two friction clutches, an auxiliary clutch for at least one of the first and second input shafts is opened to create an interruption of torque transmission within a section of the drive unit connected downstream of the clutch aggregate.

2. The drive unit according to claim 1, wherein the interruption of torque transmission takes place within the transmission or gearbox.

3. The drive unit according to claim 1, wherein the auxiliary clutch can be closed again after elimination of the malfunction.

4. The drive unit according to claim 1, wherein means for interruption of torque transmission are connected upstream of gears that are accommodated on the gearbox input shaft assigned to the clutch aggregate.

5. The drive unit according to claim 1, wherein the interruption of torque transmission takes place through disengagement of a gear of the transmission or gearbox.

* * * * *